United States Patent [19]

Kawata et al.

[11] Patent Number: 5,161,028
[45] Date of Patent: Nov. 3, 1992

[54] CAR-MOUNTED VIDEO DISPLAYING APPARATUS

[75] Inventors: Norio Kawata; Masaaki Takuma, both of Saitama, Japan

[73] Assignee: Kabushiki Kaisha Toshiba, Kawasaki, Japan

[21] Appl. No.: 758,496

[22] Filed: Sep. 5, 1991

Related U.S. Application Data

[63] Continuation of Ser. No. 553,968, Jul. 18, 1990, abandoned.

[30] Foreign Application Priority Data

Jul. 20, 1989 [JP] Japan ............................. 1-84527[U]

[51] Int. Cl.$^5$ .......................... H04N 5/64; G60R 11/02
[52] U.S. Cl. ..................................... 358/254; 358/229; 455/348; 312/7.2; 248/917
[58] Field of Search ................. 358/248, 254, 229; 455/347, 348; 340/705, 764; 361/391; 312/7.2; 248/286, 917, 918, 919, 922, 923; 224/273, 281

[56] References Cited

U.S. PATENT DOCUMENTS

| | | | |
|---|---|---|---|
| 4,623,110 | 11/1986 | Kanari | 455/348 |
| 4,709,405 | 11/1987 | Okazaki | 455/348 |
| 5,052,728 | 10/1991 | Fukumoto | 224/281 |

FOREIGN PATENT DOCUMENTS

| | | |
|---|---|---|
| 0098090 | 6/1983 | European Pat. Off. |
| 0338405 | 4/1989 | European Pat. Off. |
| 61-282139 | 12/1986 | Japan |
| 63-53144 | 3/1988 | Japan |
| 12948 | 11/1988 | Japan |
| 63-283374 | 11/1988 | Japan |
| 1-218936 | 9/1989 | Japan ................... 224/281 |

Primary Examiner—Edward L. Coles, Sr.
Assistant Examiner—Thomas D. Lee
Attorney, Agent, or Firm—Cushman, Darby & Cushman

[57] ABSTRACT

In this invention, a first slider is slidably provided in a holding part provided in a housing part within a car, a second slider is further slidably provided along this first slider and a liquid crystal display is rotatably provided through a hinge at the tip of this second slider. Further, an engaging means is provided on said housing part and second slider so that, when the liquid crystal display is housed, the above mentioned display, second slider and first slider may be disengageably housed within the above mentioned holding part by the above mentioned engaging means and the liquid crystal display may be always kept energized in the sliding direction by the energizing means and, when the liquid crystal display is to be used, it may be easy to move in the sliding direction by the energizing force. With such formation, when the liquid crystal display is to be used, it is perfectly pulled out of the holding part and is rotated upward at the end so that the liquid crystal displaying part may face the driver side and, by the operation reverse to this, the liquid crystal display can be housed within the holding part.

7 Claims, 6 Drawing Sheets

CAR-MOUNTED VIDEO DISPLAYING APPARATUS

This is a continuation of application Ser. No. 07/553,968, filed on Jul. 18, 1990, which was abandoned upon the filing hereof.

BACKGROUND OF THE INVENTION

1. Field of the Invention

This invention relates to a car-mounted video displaying apparatus provided within a car to provide the driver or the like with various kinds of information.

2. Description of the Related Arts

Recently, cars have been provided with a display for improving the inhabitability and driving operation.

Such a display has as one object, to provide the driver of the car with various kinds of information and is preferrably embedded in such a front surface facing the driver's seat, such as the console box surface or dashboard surface or within this dashboard.

However, generally in such surfaces, other parts are arranged, such as a radio or stereo set and such various other apparatus as a ventilator grill of an air conditioner. Therefore, in a case where the above mentioned display is formed of a CRT (cathode ray tube), it will be difficult to secure the.

Therefore, for example, in the publication of Japanese Patent Application Laid Open No. 282139/1986 is disclosed an art wherein a slider slidable toward the near side (toward the driver) is provided within the above mentioned console box and a liquid crystal display is housed within the slider. This liquid crystal display is formed to be of dimensions within the DIN (Deutsche Industrie Norm), is connected on the near side (driver's seat side) with the above mentioned slider at the near side end so as to be rotatable through a hinge and is provided on the upper surface with a liquid crystal display part.

As required, the slider is pulled out, the liquid crystal display is raised on the front side (the side opposite the driver's seat side) and the angle is fixed by a bendable stay provided on the back surface of the above mentioned liquid display.

However, according to this art, when raising the liquid crystal display, first of all, the slider must be pulled out to be above the length of the liquid crystal display and the operation is complicated.

Also, for example, in the publication of Japanese Patent Application Laid Open No. 283374/1988 is disclosed an art wherein the slider is connected at the near side end with the above mentioned liquid crystal display at the front side end through a hinge.

That is to say, as shown in FIGS. 11 and 12, a console box 1 is provided with a housing part 2 which is provided slidably with a slider 3 formed to be comparatively short. At the near side end of this slider 3 is rotatably provided a liquid crystal display 4 through a hinge so that, as required, when the above mentioned slider 3 is slid to the near side, the liquid crystal display 4 may be pulled out and rotated through the hinge.

However, in this prior art, when the liquid crystal display 4 is rotated downward to be opposed to the driver's seat as shown by the dashed line in FIG. 12, such other devices arranged in the above mentioned console box 1 as the audio apparatus 5 will be hidden by the back surface of the liquid crystal display 4 so as to be inoperative or the ash tray 6 will be likely to become difficult to use. Further, in case the car on which this art is used is a small car, the liquid crystal display 4 will contact the shift lever 7 to be likely to become unable to rotate as shown by the dashed line in FIG. 12.

In order to cope with this problem, the above mentioned liquid crystal display 4 may be formed to rotate to the upper side. However, generally the dashboard 8 is provided with an overhanging part 9 to intercept light and therefore, as shown by the solid line in FIG. 12, the above mentioned liquid crystal display 4 may contact this overhanging part 9 which can prevent complete rotation. On the other hand, if the above mentioned slider 3 fitting position is moved downward, a sufficient rotation will be possible but the perceptibility of the liquid crystal will be unavoidably deteriorated.

SUMMARY OF THE INVENTION

The present invention is made to solve this problem and has as an object, to provide a car-mounted video displaying apparatus wherein a display can be not only housed within a small space but also pulled out by a simple operation and opposed to the driver or the like and the operation and perceptibility of other apparatus are prevented from being deteriorated.

That is to say, a car-mounted video displaying apparatus according to the present invention comprises a holding part provided in a housing part within a car, a first slider slidably provided in this holding part, a second slider further slidable along this first slider, a liquid crystal display provided rotatably through a hinge provided at the tip of this second slider, an engaging means for engaging the above mentioned liquid crystal display, second slider and first slider within the above mentioned holding part and an energizing means for energizing the above mentioned second slider, liquid crystal display and first slider in the sliding direction while engaged by this engaging means and moving them in the sliding direction when the engagement by the engaging means is released.

DETAILED DESCRIPTION OF THE PREFERRED EMBODIMENT

Figure 1A:
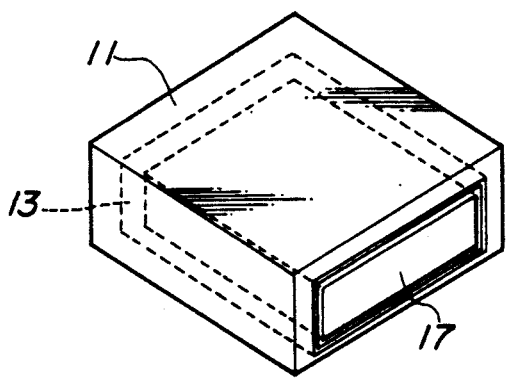
FIG. 1 is a perspective view of a car-mounted video displaying apparatus relating to an embodiment of the present invention.
Figure 1B:
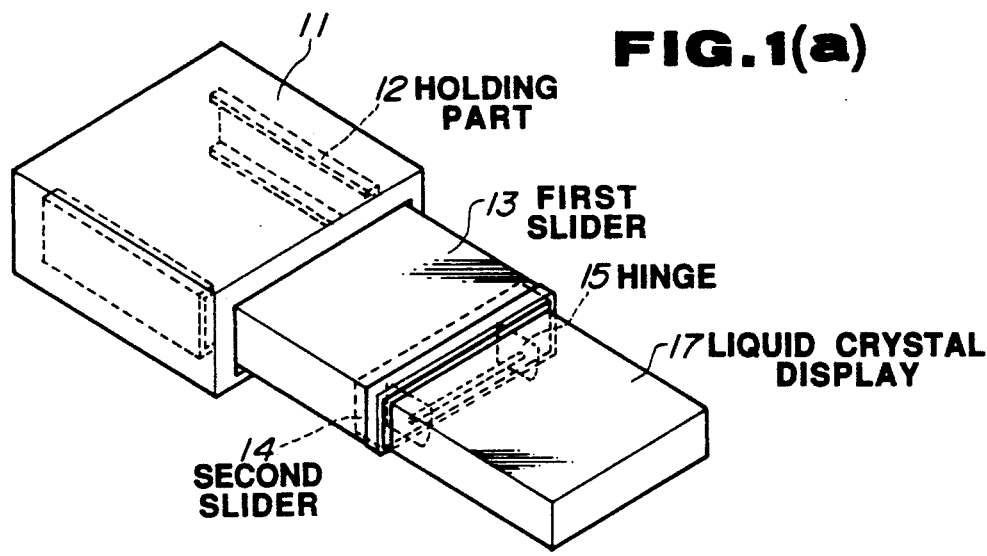
Figure 1C:
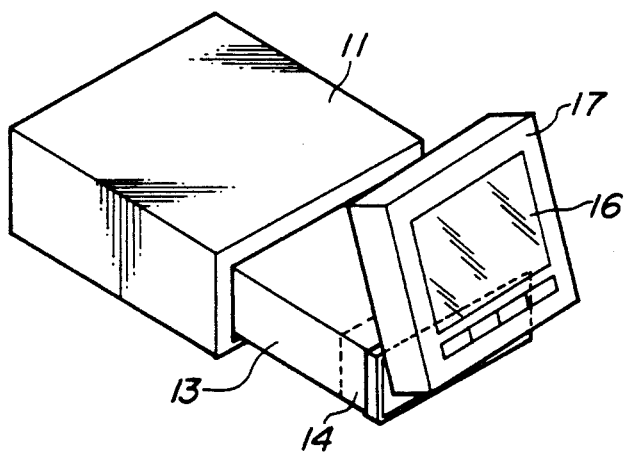

FIG. 1 is a perspective view of a car-mounted video displaying apparatus showing an embodiment of the present invention. In FIG. 1, the reference numeral 11 represents a cover. A holding part 12 formed of a pair of channel-like members is fixed on the right and left inside this cover 11 as shown in FIG. (b) and is provided slidably with a first slider 13 formed like a rectangular pipe.

A slidable second slider 14 is housed within this first slider 13. A display 17 having a liquid crystal displaying part 16 on the lower surface is provided rotatably as shown in FIG. (c) through a hinge 15 arranged on the driver's seat side in the sliding direction of the second slider 14.

Figure 2:
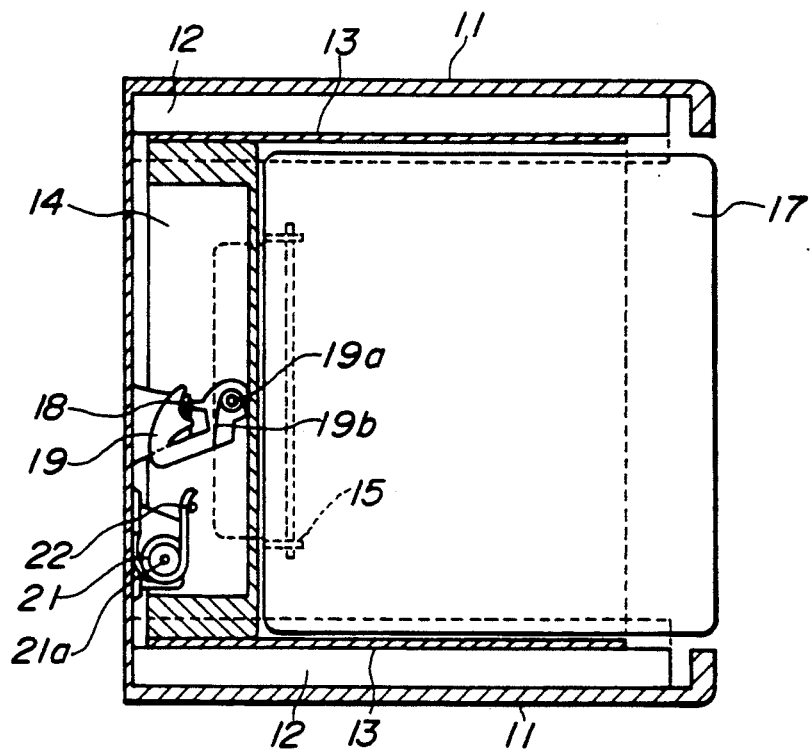
FIG. 2 is a bottom view showing the apparatus of FIG. 1 as housed.
Figure 5:
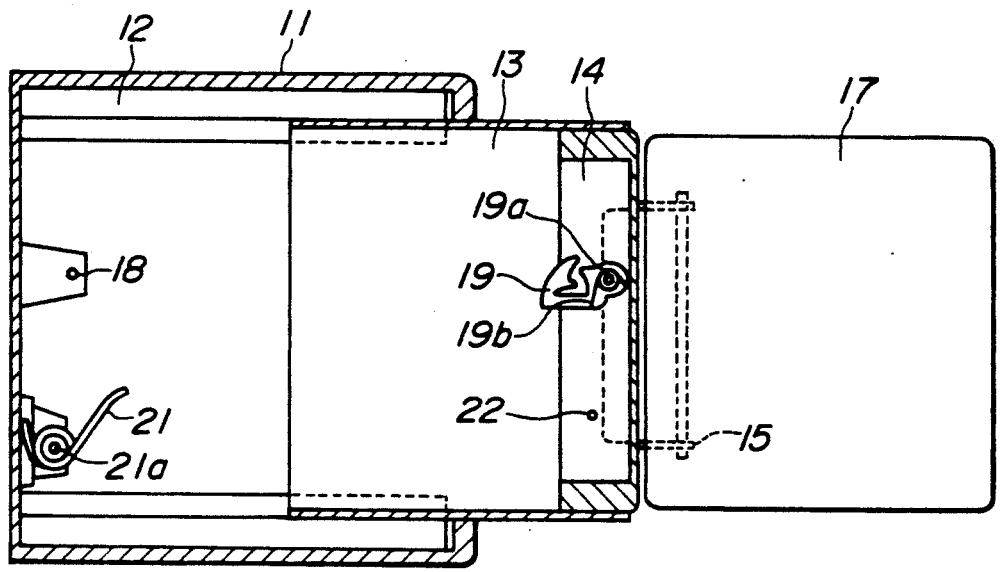
FIG. 5 is a bottom view showing a display of the apparatus of FIG. 1 as pulled out.

As shown in the bottom views in FIGS. 2 and 5, a bar-like engaging pin 18 is provided on the inside surface of the inner part of the above mentioned cover 11 and, on the other hand, a heart cam 19 engaging with this engaging pin 18 is provided on the front side of the above mentioned second slider 14. The heart cam 19 is rotatably fitted at one end to a pin 19a provided on the second slider 14 with the rotation angle regulated and is given an energizing force in one direction (in the drawing, in the clockwise direction) by a spring 19b. The heart cam 19 is formed at the other end to be substantially heart-like, is curved arcuately in the front side direction in the outside form and is formed to be concave in the front side direction in the inside form. When the engaging pin 18 contacts the heart cam 19 in the arcuate part of its contour, the cam in the arcuate part will be rotated counter-clockwise and, when the tip of the arcuate part of the cam rotates to the position of the pin 18 and the pin 18 enters the concave part on the inside, the cam will be rotated clockwise by the energizing force of the spring 19b and the pin 18 will be engaged with the cam in the concave part. On the contrary, in releasing this engagement, when the liquid crystal display 17 is pressed from the right in the drawing to push the second slider 14 leftward, the cam in the concave part and the pin 18 will be disengaged with each other, the heart cam 19 will be rotated clockwise by the energizing force of the spring 19b, the pin 18 will further enter the concave part inside the heart cam 19 and will enter a disengaging guide groove (not illustrated) provided there and thereby the heart cam 19 and pin 18 will be perfectly disengaged with each other. Thus, when the heart cam 19 is engaged with the above mentioned engaging pin 18, the above mentioned second slider 14 and first slider 13 will be disengageably fixed to the cover 11. Also, a resilient body 21 is arranged on the inside surface of the inner part of the above mentioned cover 11 and is formed of a coil spring fitted to the inside surface of the cover 11. The spring is fixed at one end in contact with the inside surface of the cover 11 and is opened at the other end so as to be able to generate an energizing force to the driver's seat side in the sliding direction. In a case where the above mentioned second slider 14 is fixed to the holding part 12, a bar-like pressing pin 22 provided at the front side end of this second slider 14 will be pressed by the above mentioned resilient body 21 so that the second slider 14 is always energized to the driver's seat side when the slider 14 and display 17 are recessed in cover 11. It is needless to say that the member to contact the resilient body 21 need not always be a bar-like pin but may be plate-like.

Figure 3:
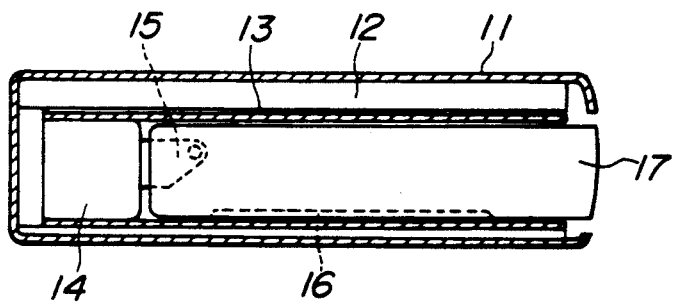
FIG. 3 is a side view of FIG. 2.
Figure 4:
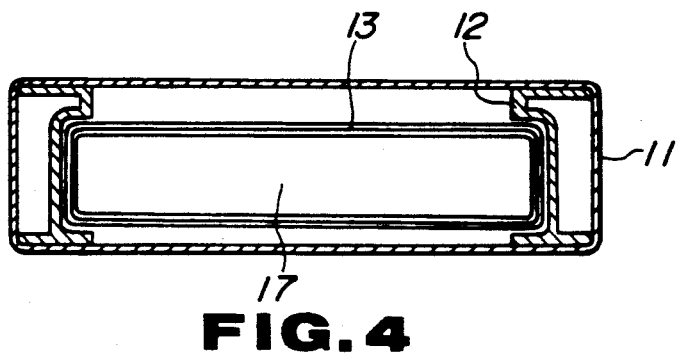
FIG. 4 is an elevation of FIG. 2.

As shown in the side view of FIG. 3, the length of the above mentioned holding part 12 is so set that, in case the above mentioned second slider 14 is fixed to the holding part 12, the driver's seat side end surface of the display 17 may substantially coincide with the driver's seat side end part of the cover 11. When the above mentioned display 17 is pressed on the driver's seat side end surface, the above mentioned heart cam 19 and engaging pin 18 will be disengaged with each other and, when the pressing pin 22 is pressed by the resilient body 21, the above mentioned liquid crystal display 17 will be protected to the driver's seat side out of the end surface of the cover 11. In this case, first the second slider 14 will be pushed out and therefore the liquid crystal display 17 connected to the second slider 14 will also be pushed out of the cover 11. Then the liquid crystal display 17 can be further pulled out to a fully extended position, as shown in FIGS. 5 and 6.

Figure 6:
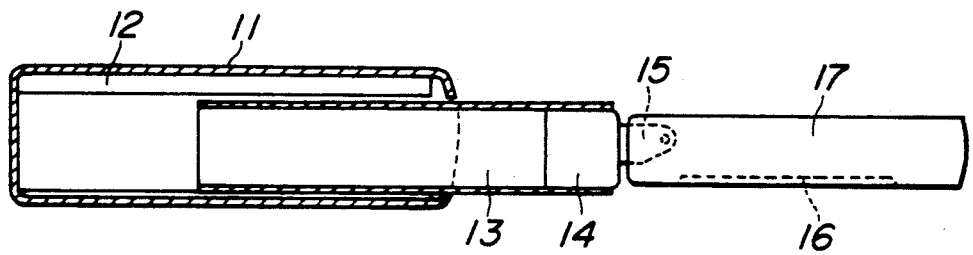
FIG. 6 is a side view of FIG. 5.
Figure 7:
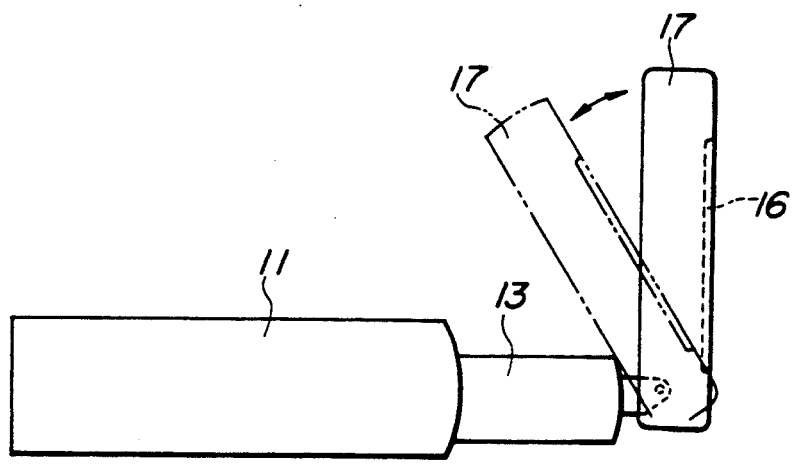
FIG. 7 is a side view showing the display of the apparatus of FIG. 1 as rotated.

When the above mentioned hinge 15 is projected out of the slider 13 as shown in FIGS. 5 and 6, the display 17 will become bendable with respect to the second slider 14 through this hinge 15 and the liquid crystal displaying part 16 provided on the lower surface of the above mentioned display 17 will be able to be directed to the driver's seat side as shown in FIG. 7.

Figure 8:
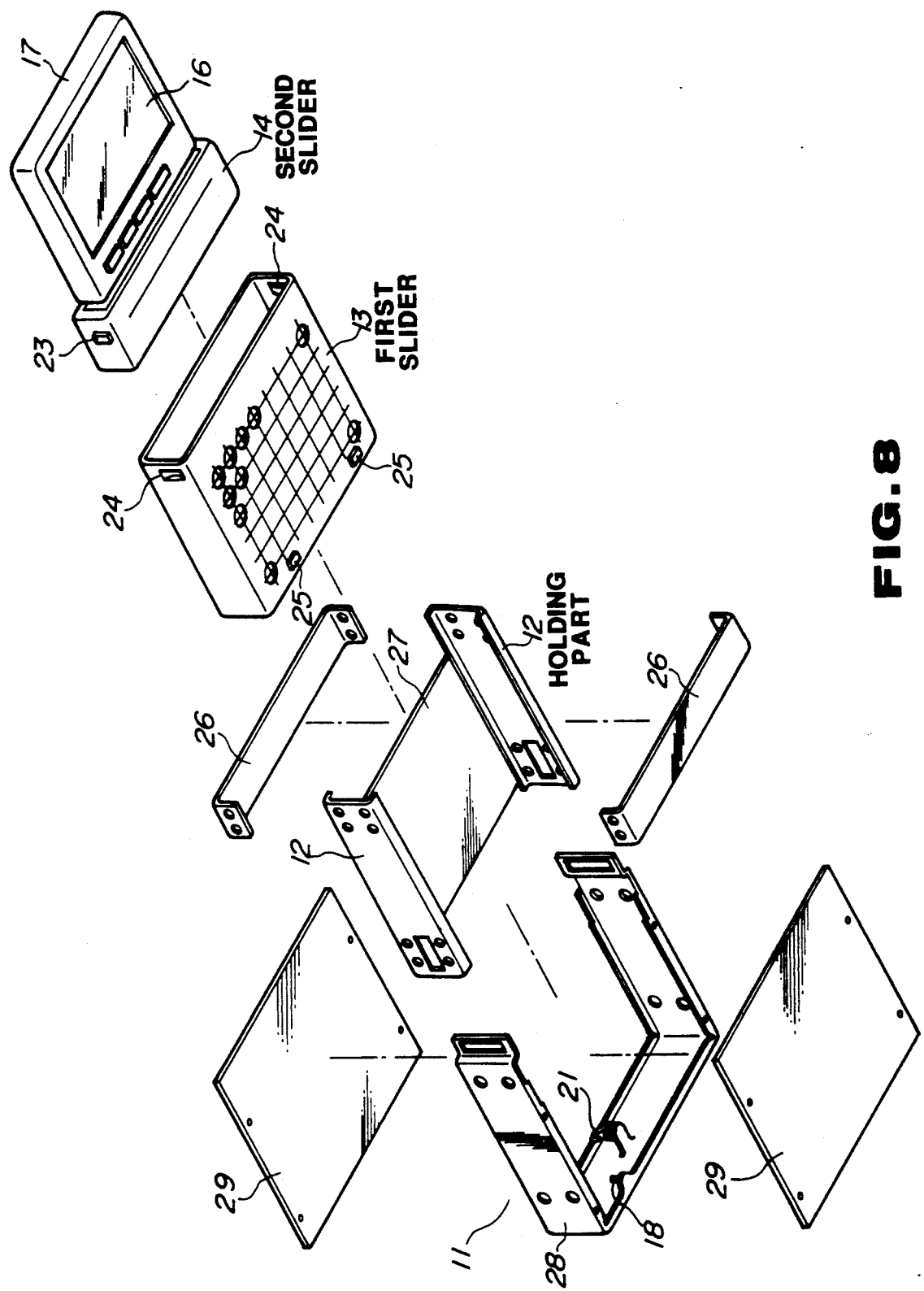
FIG. 8 is a perspective view of the car-mounted video displaying apparatus of FIG. 1 as disassembled.

FIG. 8 shows a perspective view of a car-mounted video displaying apparatus as disassembled. As shown in FIG. 8, a stopper 23 formed like a projection is provided on each side surface of the above mentioned slider 14 and contacts an engaging part 24 provided like a projection on each inside surface side of the driver's seat side of the above mentioned first slider 13 so that when the display 17 is pulled out, the above mentioned second slider 14 will not be pulled out of the first slider 13 but both will remain engaged with each other. Further, by the stopper 23 and engaging part 24, the second slider 14 will be stopped in the position in which the hinge 15 projects out of the first slider 13. Also, stoppers 25 are provided on the front side lower surface of the above mentioned first slider 13 and contact reinforcing members 26 fixed above and below the above mentioned holding part 12 so that the above mentioned first slider 13 and holding part 12 may be kept engaged. The holding part 12 is formed of a pair of members opposed to each other and has a circuit substrate 27 fitted to the upper side. The cover 11 is formed of a channel-like frame 28 and a pair of lids 29 fitted to the upper and lower sides and has the engaging pin 18 and resilient body 21 fitted to the inside surface of the inner part of the frame 28.

Figure 9:
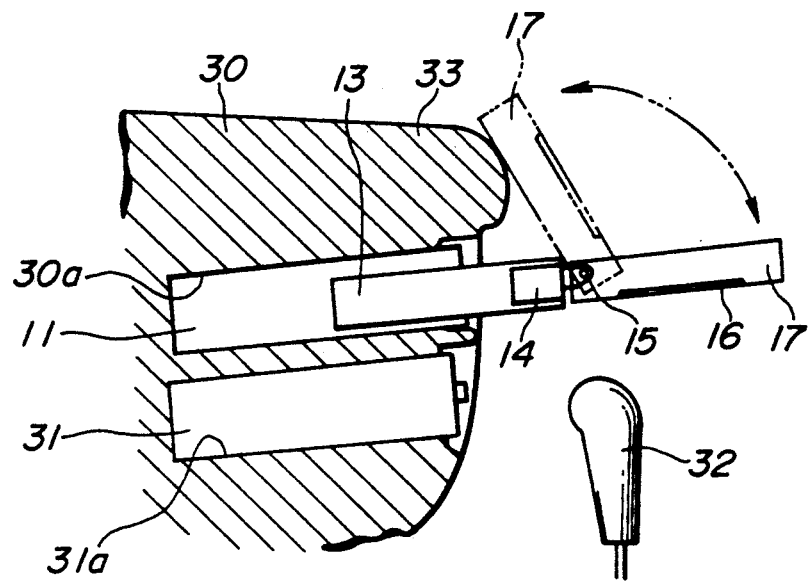
FIG. 9 is a side view showing the operation of the apparatus of FIG. 1 as fitted to a car.

As shown in the side view showing the operation in FIG. 9, the car-mounted video displaying apparatus having such a formation as described above is housed in a housing recess 30a formed to be of substantially the same shape as of the cover 11. The above mentioned housing recess 30a is provided in the upper part of the dashboard 30 and above another housing recess 31a in which such audio apparatus 31 as a radio set is housed and is inclinable upward toward the driver's seat side so that, even in case the display 17 is pulled out, it may not contact a change lever 32.

In the case of pulling out the display 17, the end part of the display 17 exposed out of the driver's seat side end part of the holding part 12 within the cover 11 is pressed with a finger or the like to disengage the heart cam 19 provided in the second slider 14 and the engaging pin 18 fitted to the above mentioned cover 11 with each other. In this state, when the pressure by the finger or the like on the above mentioned display 17 is released, the second slider 14 holding the display 17 will be moved to the driver's seat side within the range of the energizing force of the resilient body 21. That is to say, the energizing force of the resilient body 21 will push out the second slider 14 and therefore, the display 17. At this time, the display 17 projects slightly from the second slider 14 so that it may be grasped.

Then, when the above mentioned display 17 is gripped at the driver's seat side end or the like and is pulled to the driver's seat side, the first slider 13 arranged in contact with the second slider 14 will be pulled together out toward the driving seat side with the display 17 until stoppers 25 of the first slider 13 contact the reinforcing members 26 to stop the above mentioned first slider 13 and stoppers 23 contact the engaging part 24 to stop the movement of the second slider 14.

Then, as mentioned above, the display 17 can be rotated through the above mentioned hinge 15, as shown by the dashed line in FIG. 9. The display 17 will be rotated upward at the driver's seat side end so that the liquid crystal displaying part provided on the lower surface of the display 17 may be directed to the driver's seat side.

In this state, the above mentioned first slider 13 is slid to the front side and the above mentioned display 17 is moved until the back surface of the display 17 contacts the overhanging part 33 of the above mentioned dashboard 30. As a result, this display 17 will conceal only a portion of the overhanging part 33 on which nothing is arranged, thereby preventing difficulty in operating other devices arranged on the dashboard 30 and minimizing the space it occupies.

Figure 10:
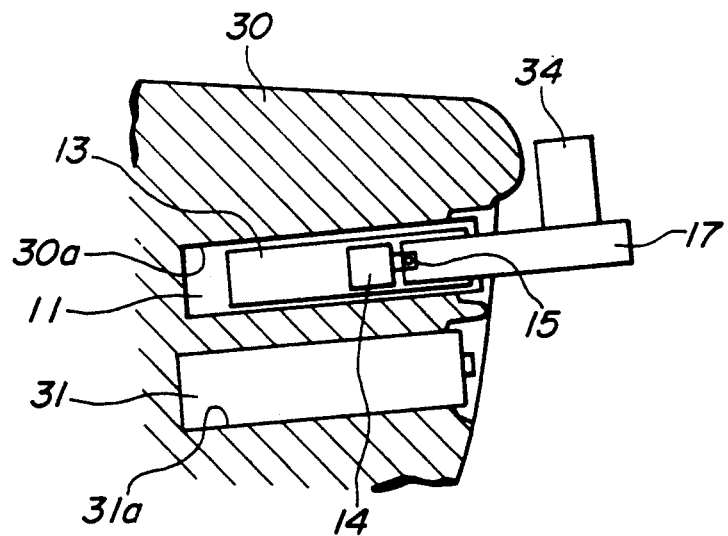
FIG. 10 is an explanatory view showing an accompanying effect of the apparatus of FIG. 1 as fitted to a car.
Figure 11:
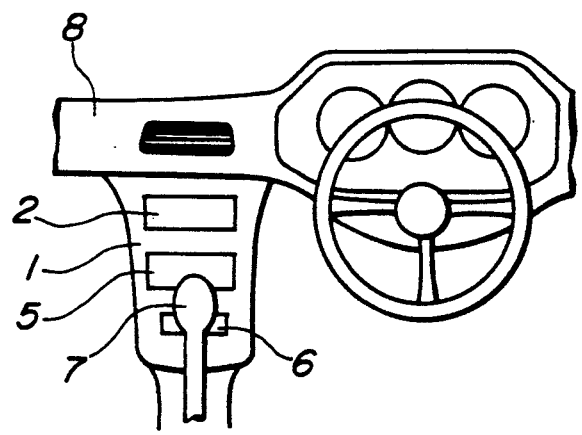
FIG. 11 is an elevation of a dashboard relating to a prior art.
Figure 12:
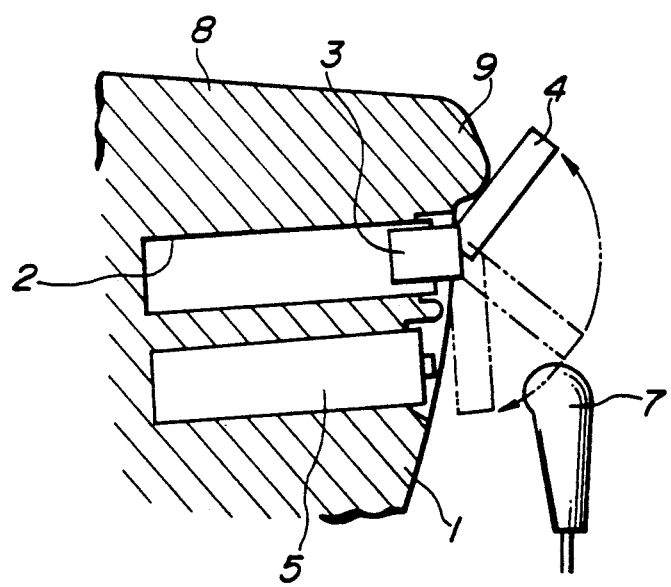
FIG. 12 is a side view showing the operation of the liquid crystal display of FIG. 11.

As shown in the side view of FIG. 10, when only the above mentioned display 17 or only the first slider 13 holding this display 17 is pulled out, the upper surface of the display 17 or first slider 13 will be able to be used as a mounting stand on which any small articles (for example, cigarettes) 34 may be placed.

To recess the display 17, display 17, the display 17 is gripped at the upper end and is rotated with the hinge 15 as a center so as to be substantially aligned with the first slider 13. Then, when this display 17 is pressed at the driver's seat side end to the front side, the above mentioned first slider 13 will slide in the holding part 12 and will contact the inside surface of the inner part of the cover 11 so as to stop. Then, when the above mentioned display 17 is further pressed, the second slider 14 will slide within the above mentioned first slider 13 to the front side and the pressing pin 22 provided on this second slider 14 will contact the resilient body 21 arranged in the above mentioned cover 11. When the display 17 is further pressed against the energizing force of this resilient body 21, the heart cam 19 of the above mentioned second slider 14 will engage with the engaging pin 18 of the cover 11 so as to fix the display 17 and cover 11 with each other.

As explained above, the car-mounted video displaying apparatus according to the present invention has as advantages that not only can display housing space be saved but also the display can be pulled out by a simple operation to be opposed to the driver or the like and will not detract from the operation and perceptibility of other apparatus. There is also an accompanying effect that, as the display is housed with the liquid crystal displaying part directed below, when the display is not used, it will be able to be used as a stand on which any articles may be placed.

It should be understood that the present invention is not limited to the above mentioned embodiment but can be variously modified and worked in the range not deviating from its subject matter.

What is claimed is:

1. A car-mounted video displaying apparatus comprising:
    a holding part provided in a housing part within a car;
    a first slider slidably provided in said holding part;
    a second slider further slidable along said first slider;
    a liquid crystal display provided rotatably through a hinge provided at the tip of said second slider;
    engaging means for engaging said liquid crystal display, second slider and first slider within said holding part when said liquid crystal display is to be housed within said holding part by pushing said liquid crystal display into said holding part and disengaging them by further pushing said liquid crystal display into said holding part when said liquid crystal display is to be used; and
    energizing means for energizing said second slider and liquid crystal display in a direction outward from a dashboard while engaged by said engaging means and moving them outward from the dashboard when said engaging means is disengaged.

2. A car-mounted video displaying apparatus according to claim 1 wherein a first stopper means for keeping said holding part and first slider engaged with each other when said first slider slides is provided between said holding part and first slider.

3. A car-mounted video displaying apparatus according to claim 1 wherein a second stopper means for keeping said first and second sliders engaged with each other when said first and second sliders slide is provided between said first slider and second slider.

4. A car-mounted video displaying apparatus according to claim 1 wherein said engaging means comprises:
    an engaging pin provided in the inner part of a housing part in which said holding part is provided; and
    a heart cam provided on the front side of said second slider to disengageably engage said engaging pin.

5. A car-mounted video displaying apparatus according to claim 1 wherein said energizing means comprises:
    a resilient body provided in the inner part of a housing part in which said holding part is provided; and
    a member provided on the front side of said second slider to press said resilient body.

6. A car-mounted video displaying apparatus according to claim 1 wherein said liquid crystal display comprises means for supporting objects on a backside thereof, the supporting means usable when the liquid crystal display is only partially extended from the holding part.

7. A car-mounted video displaying apparatus comprising:
    a holding part provided in a housing part within a car;
    a first slider slidably provided in said holding part;
    a second slider further slidable along said first slider;
    a liquid crystal display provided rotatably through a hinge provided at the tip of said second slider;
    engaging means for engaging said liquid crystal display, second slider and first slider within said holding part when said liquid crystal display is to be housed within said holding part by pushing said liquid crystal display into said holding part and disengaging them by further pushing said liquid crystal display into said holding part when said liquid crystal display is to be used; and
    energizing means for energizing said second slider and liquid crystal display in a direction outward from a dashboard while engaged by said engaging means and moving them outward from the dashboard when said engaging means is disengaged, wherein said liquid crystal display comprises means for supporting objects on a backside thereof, the supporting means usable when the liquid crystal display is only partially extended from the holding part.

* * * * *